US009239817B2

(12) United States Patent
Claux et al.

(10) Patent No.: US 9,239,817 B2
(45) Date of Patent: Jan. 19, 2016

(54) MANAGING WEB EXTENSION THROUGH MANIFEST FILE

(71) Applicant: MICROSOFT TECHNOLOGY LICENSING, LLC, Redmond, WA (US)

(72) Inventors: David Claux, Redmond, WA (US); Patrick Conlan, Seattle, WA (US); Rolando Jimenez Salgado, Sammamish, WA (US); Warren Byrne, Esparto, CA (US); Andrew Salamatov, Seattle, WA (US); Carlos Brito, Sammamish, WA (US); Oleg Ouliankine, Redmond, WA (US); Oleg Ovanesyan, Redmond, WA (US); Jason Henderson, Tacoma, WA (US); Ben Sack, Seattle, WA (US); Steve Clagg, Seattle, WA (US); Sudhakar Pasupuleti, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 334 days.

(21) Appl. No.: 13/682,556

(22) Filed: Nov. 20, 2012

(65) Prior Publication Data

US 2013/0283139 A1 Oct. 24, 2013

Related U.S. Application Data

(60) Provisional application No. 61/635,401, filed on Apr. 19, 2012.

(51) Int. Cl.
*G06F 17/20* (2006.01)
*G06F 9/445* (2006.01)
*H04L 29/08* (2006.01)

(52) U.S. Cl.
CPC ............ *G06F 17/20* (2013.01); *G06F 9/44526* (2013.01); *H04L 67/02* (2013.01)

(58) Field of Classification Search
CPC .................................................... G06F 17/2235
USPC ........................................................ 715/205
See application file for complete search history.

(56) References Cited

U.S. PATENT DOCUMENTS

| 7,000,230 | B1 | 2/2006 | Murray et al. |
| 7,814,484 | B2 | 10/2010 | Griffith et al. |
| 8,255,494 | B1 * | 8/2012 | Boodman et al. ............. 709/219 |

(Continued)

OTHER PUBLICATIONS

Guha, Arjun, Matthew Fredrikson, Benjamin Livshits, and Nikhil Swamy. "Verified security for browser extensions." In Security and Privacy (SP), 2011 IEEE Symposium on, pp. 115-130. IEEE, 2011.*

(Continued)

*Primary Examiner* — Frank D Mills
(74) *Attorney, Agent, or Firm* — Joann Dewey; Jim Ross; Micky Minhas (57) ABSTRACT

A web extension is managed through a manifest file. An application managing the web extension receives attributes of the extension from a developer or metadata of the extension. A pointer to the web extension is inserted into the attributes. The pointer can be used as a link to activate the web extension. The attributes are stored in a manifest file formatted in extensible markup language (XML). The functionality of the web extension is managed based on the manifest file.

20 Claims, 6 Drawing Sheets

(56) References Cited

U.S. PATENT DOCUMENTS

| | | | |
|---|---|---|---|
| 8,261,258 B1* | 9/2012 | Jianu et al. | 717/174 |
| 2002/0100017 A1* | 7/2002 | Grier | G06F 8/54 717/120 |
| 2003/0229608 A1* | 12/2003 | Reynar et al. | 707/1 |
| 2004/0003371 A1* | 1/2004 | Coulthard et al. | 717/101 |
| 2004/0003389 A1* | 1/2004 | Reynar et al. | 717/178 |
| 2005/0033728 A1 | 2/2005 | James et al. | |
| 2005/0108433 A1* | 5/2005 | Wu et al. | 709/246 |
| 2005/0278718 A1* | 12/2005 | Griffith et al. | 717/175 |
| 2006/0026591 A1* | 2/2006 | Backhouse et al. | 717/177 |
| 2006/0069736 A1* | 3/2006 | Czeisler et al. | 709/207 |
| 2006/0161563 A1* | 7/2006 | Besbris et al. | 707/100 |
| 2006/0253854 A1* | 11/2006 | Elvanoglu et al. | 718/100 |
| 2007/0089084 A1* | 4/2007 | Elaasar | 717/100 |
| 2007/0156913 A1* | 7/2007 | Miyamoto et al. | 709/230 |
| 2007/0174824 A1 | 7/2007 | Relyea et al. | |
| 2007/0277109 A1* | 11/2007 | Chen et al. | 715/733 |
| 2009/0172637 A1* | 7/2009 | Parikh | 717/114 |
| 2009/0217306 A1* | 8/2009 | Wusthoff et al. | 719/327 |
| 2009/0300597 A1 | 12/2009 | George et al. | |
| 2010/0306735 A1* | 12/2010 | Hoff et al. | 717/109 |
| 2012/0102483 A1 | 4/2012 | Goldman | |
| 2012/0102485 A1* | 4/2012 | Goldman | 717/176 |
| 2013/0024851 A1* | 1/2013 | Firman et al. | 717/170 |
| 2013/0346872 A1* | 12/2013 | Scott | G06F 17/3064 715/738 |
| 2014/0047429 A1* | 2/2014 | Gaither | G06F 8/60 717/170 |

OTHER PUBLICATIONS

Juric, Matjaz B., Ana Sasa, Bostjan Brumen, and Ivan Rozman. "WSDL and UDDI extensions for version support in web services." Journal of Systems and Software 82, No. 8 (2009): 1326-1343.*

"Packaging and Signing an Extension for Distribution", Retrieved at <<http://cssdk.host.adobe.com/sdk/1.5/docs/WebHelp/programmers_guide/Deploy.htm>>, Retrieved Date : Aug. 27, 2012, pp. 4.

"International Search Report", Mailed Date: Jul. 19, 2013, Application No. PCT/US2013/036518, Filed date: Apr. 15, 2013, pp. 10.

* cited by examiner

MANAGING WEB EXTENSION THROUGH MANIFEST FILE

CROSS REFERENCE TO RELATED APPLICATIONS

This application claims the benefit of U.S. Provisional Patent Application Ser. No. 61/635,401 filed on Apr. 19, 2012. The disclosures of the provisional patent application are hereby incorporated by reference for all purposes.

BACKGROUND

Data analysis is an integral part of modern services provided by software. Analysis services span a vast array of information mining and mapping. Analysis systems receive content from variety of resources including business and social networking systems. User information is also gathered and collected from ever expanding array of personal devices. User generated content is stored and managed by expansive systems providing interactive services with the stored information. The ever expanding amount of information generated by systems and users are processed by analysis systems to produce patterns, predictions, etc. Analysis results are utilized by other systems relying on the results to generate reports, evaluate user performance, determine recommendations, etc.

External tools expand longevity of legacy solutions. Integrated tools can enable an existing application to provide new functionality. An existing solution lacking analysis functionality can add analysis features through integrated tools. However, most third party tool solutions are custom developed and lack flexibility. Most legacy applications rarely provide standardized interfaces to integrate external tools. Vendors develop custom solutions to integrate external tools for inflexible legacy applications at great cost to a customer. Custom solutions are rarely portable or upgradeable. In addition, a typical vendor developing external tools spends resources to maintain in house legacy knowledge base. Legacy knowledge bases depreciate at alarming speed with each new product cycle and change in the technology.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to managing a web extension through a manifest file. According to some embodiments, an application may receive attributes of a web extension. The attributes may include metadata about the web extension provided automatically. Additionally, a developer may provide the attributes with sufficient privileges to access the web extension. Next, a pointer to the web extension may be added into the attributes. The pointer may be a link to the web extension used to activate the web extension. The attributes may be stored in a manifest file formatted in a structured language such as extensible markup language (XML). XML format may be used to standardize interaction between a host application and the web extension. A consumption, an activation, and a presentation of the web extension may be managed through the manifest file. The web extension may be managed according to defined attributes in the manifest file.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, a web extension may be managed through a manifest file. Attributes of a web extension may be received from a metadata of the web extension or from a developer. A pointer to the web extension may be added to the attributes which may be stored in a manifest file formatted in extensible markup language (XML). Functionality of the web extension may be managed by using the manifest file.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present disclosure is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for managing a web extension through a manifest file. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Figure 1:
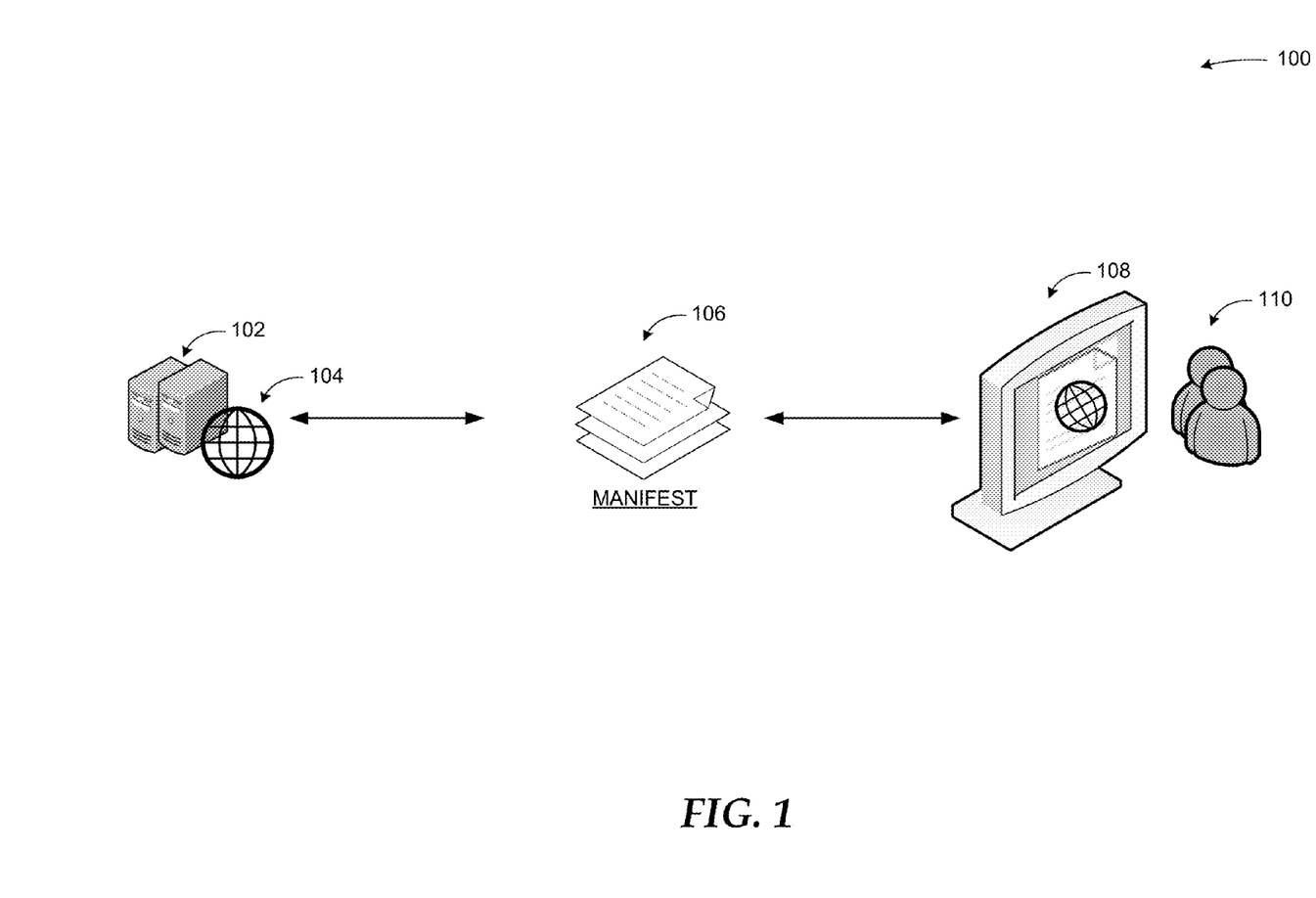
FIG. 1 illustrates an example architecture diagram where an application may manage a web extension through a manifest file according to some embodiments.

FIG. 1 illustrates an example architecture diagram where an application may manage a web extension through a manifest file according to embodiments. The components and environments shown in diagram 100 are for illustration purposes. Embodiments may be implemented in various local, networked, cloud-based and similar computing environments employing a variety of computing devices and systems, hardware and software.

An example server 102 may host one or more web extensions 104. A web extension 104 may be an in-content extension which may be manually inserted by a user into a document. The in-content extension may interact with the document. In addition, the web extension 104 may be a task-pane extension. The task-pane extension may be manually displayed by a user in a task pane. The task-pane extension may interact with task based activities associated with the document. Furthermore, the web extension 104 may be a contextual extension. The contextual extension may interact with context based activities associated with the document. The contextual extension may automatically be displayed when one or more rules of the extension may match one or more items in the document.

The manifest file 106 may be used to store attributes of the web extension 104. Metadata of the web extension 104 may be inserted into the manifest file 106 as attributes of the web extension. Alternatively, a developer having access privileges to the manifest file may insert attributes to the manifest file 106. A user 110 may manage the web extension 104 based on the attributes defined in the manifest file 106 while using the web extension in the display device 108.

Embodiments are not limited to implementation in a client-server type architecture. A web extension may be managed through a manifest file by an application executed in a peer-to-peer, distributed, cloud based, and combination type architecture. In an example scenario, an application may access and define the manifest file entirely in the display device 108.

Figure 2:
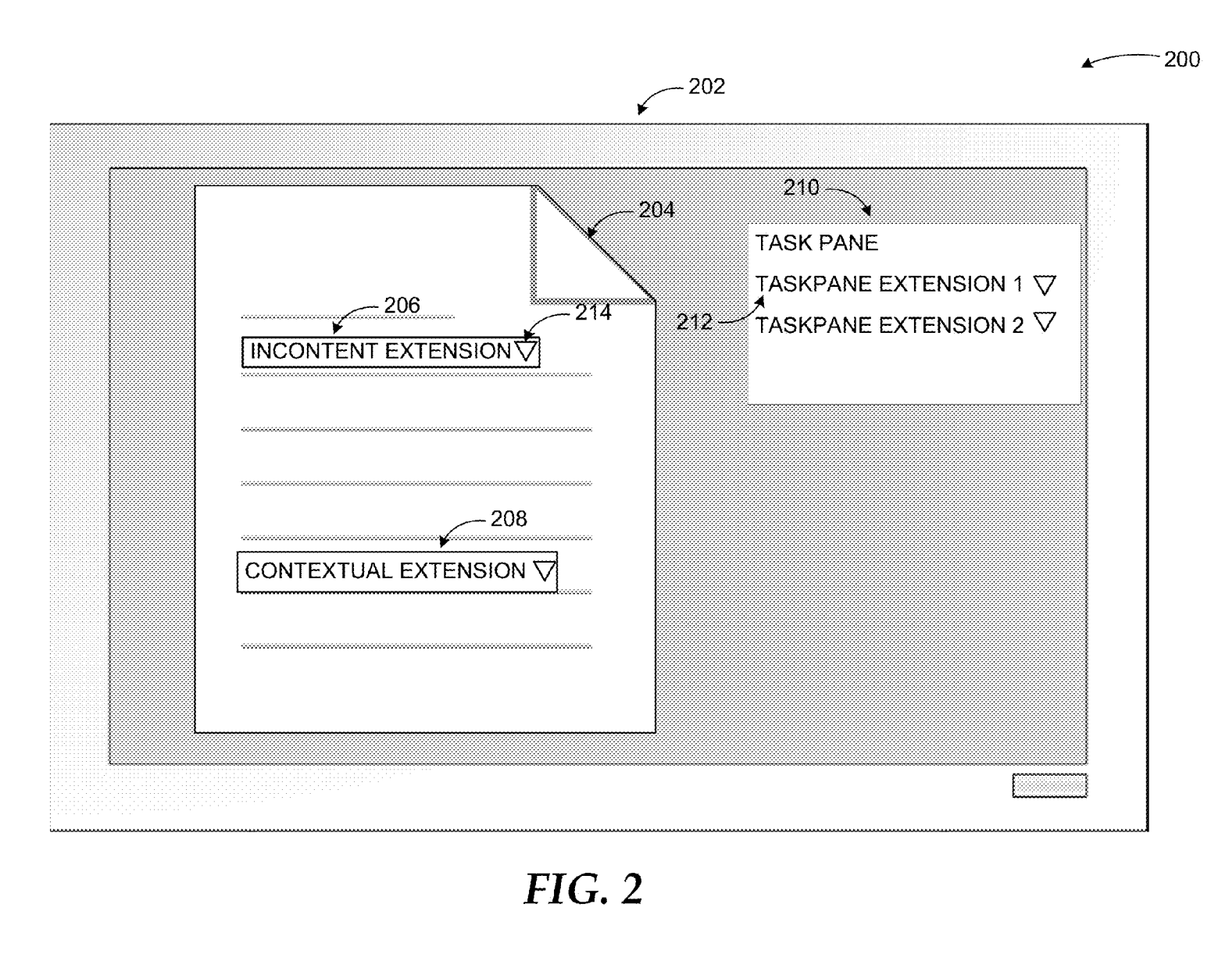
FIG. 2 illustrates an example display showing a host application and an extension pane associated with the host application according to embodiments.

FIG. 2 illustrates an example display showing a host application and an extension pane associated with the host application according to embodiments. Diagram 200 displays a host application displaying a document and web extensions in interaction with the document.

A host application may be displayed in a display device 202. The host application may be a word processor application, a spread sheet application, a presentation application, an email client application, etc. A document 204 may be presented to a user through the host application.

The host application may allow a web extension to provide external functionality to interact with the content. The manifest file may store attributes for an in-content extension 206. The application managing the web extension may detect a manual insertion by the in-content extension into a document. The in-content extension may be enabled to execute scripts to interact with the document 204 based on the manifest file. A control 214 may allow a user to manage the in-content extension 206.

Alternatively, an application managing web extensions may store attributes of a contextual extension 206. The contextual extension 206 may be associated with a document upon matching a set of rules of the extension with one or more items in the document 204, based on the manifest file. The contextual extension 206 may establish a context based on patterns matching the rules in the extension.

A task pane 210 may display a task-pane extension 212 associated with the document or a host application, based on the manifest file. The task-pane extension may provide functionality to control tasks associated with the document. In an example scenario, the task-pane extension 212 may control resources dedicated to a task associated with the document 204, based on the manifest file. The task-pane extension 212 may be manually displayed by a user in the task pane 210 adjacent to the document 204.

Figure 3:
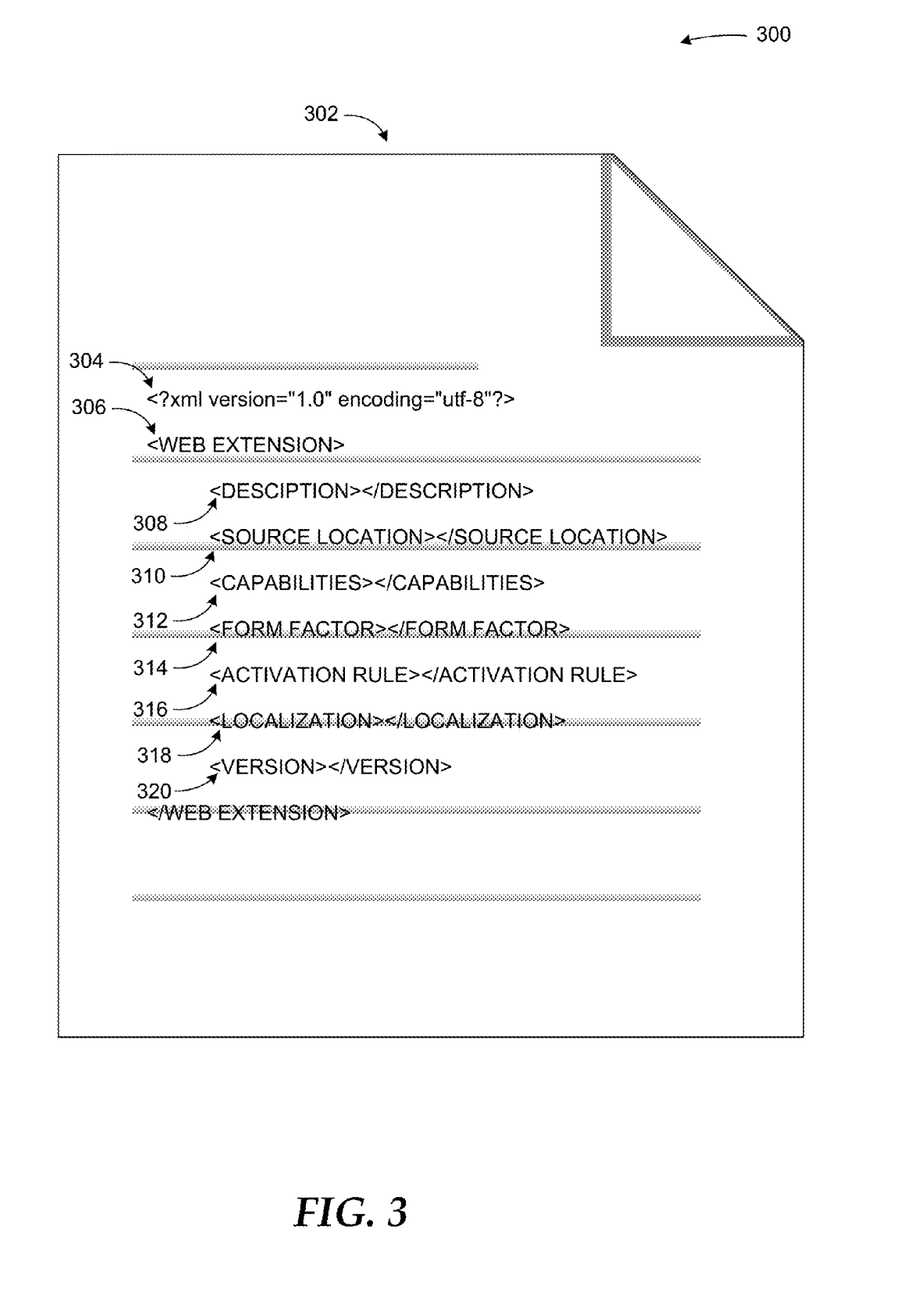
FIG. 3 illustrates an example manifest file according to embodiments.

FIG. 3 illustrates an example manifest file according to embodiments. Diagram 300 displays a manifest file 302 containing attributes of a web extension formatted in XML.

The manifest file 302 may be formatted in XML. A standard statement 304 may define the file as an XML file to an application reading the file. In addition, the manifest file 302 may define a simple packaging format to enable a developer to provide attributes of the web extension. The packaging format may also be utilized to deliver the manifest file from a marketplace to a host application.

An application managing the web extension through the manifest file may utilize a strong typed format to create the manifest file. Error minimized coding may be enforced through the strong typed format while manually creating the manifest file. The manifest file may also be automatically validated through the strong typed format. An example of strong typed format may include using a specific tag 306 to format the manifest file.

The manifest file may define a general description 308 of the web extension as an attribute. The description 308 may include identifier information specific to the web extension. In addition, a source location 310 for the web extension may be inserted into the manifest file 302. The source location may establish a link to the web extension. The web extension may be activated through the source location.

The manifest file may also define a capabilities attribute 312 of the web extension. The capabilities attribute 312 may identify capabilities supported by the web extension. In addition, the form factor attribute 314 may specify a form factor supported by the web extension including a desktop, a tablet, a smart phone, etc.

An activation rule attribute 316 may also be described by the manifest file. The activation rule attribute 316 may specify a rule determining presentation of the web extension. In addition, the manifest file may describe a localization attribute 318. The localization attribute 318 may define language translation configuration for a web extension name and a pointer. Furthermore, the manifest file may define a versioning attribute 320. The versioning attribute 320 may describe a version number for the web extension. The version number may be used to determine validity of the web extension.

In some embodiments, an optional VersionOverrides element may be provided which may enable one or more of: (1) if a developer desires to prepare an app that works in version 1 of a client application, for example, but takes advantage of new features in future versions, then the developer may be enabled to reference the version 1 schema and then specify settings/properties/elements for these features in VersionOverrides; (2) a developer may be enabled to change the way an app works between versions of a client application, all in a single manifest; (3) if there are any VersionOverrides specified, then the next version of client application may use those; for all other elements that were not specified in VersionOverrides, the client may use the ones specified in the base version (in other words, elements may be inherited from previous version section of the manifest, unless they are specifically overridden); and (4) if a developer does not want his app to work in version 1 of the app, but only in version 2, then he or she may need to reference the version 2 of the schema.

Attributes of a web extension may be provided by a developer with sufficient privileges to manage a manifest file. Alternatively, an application according to embodiments, may access a metadata of the web extension to retrieve the attributes of the web extension. The application may insert the attributes into the manifest file for future use. The attributes in the manifest file may be used to access and define functionality of the web extension.

The example scenarios and schemas in FIG. 2 through 3 are shown with specific components, data types, and configurations. Embodiments are not limited to systems according to these example configurations. Managing a web extension through a manifest file may be implemented in configurations employing fewer or additional components in applications and user interfaces. Furthermore, the example schema and components shown in FIG. 2 through 3 and their subcomponents may be implemented in a similar manner with other values using the principles described herein.

Figure 4:
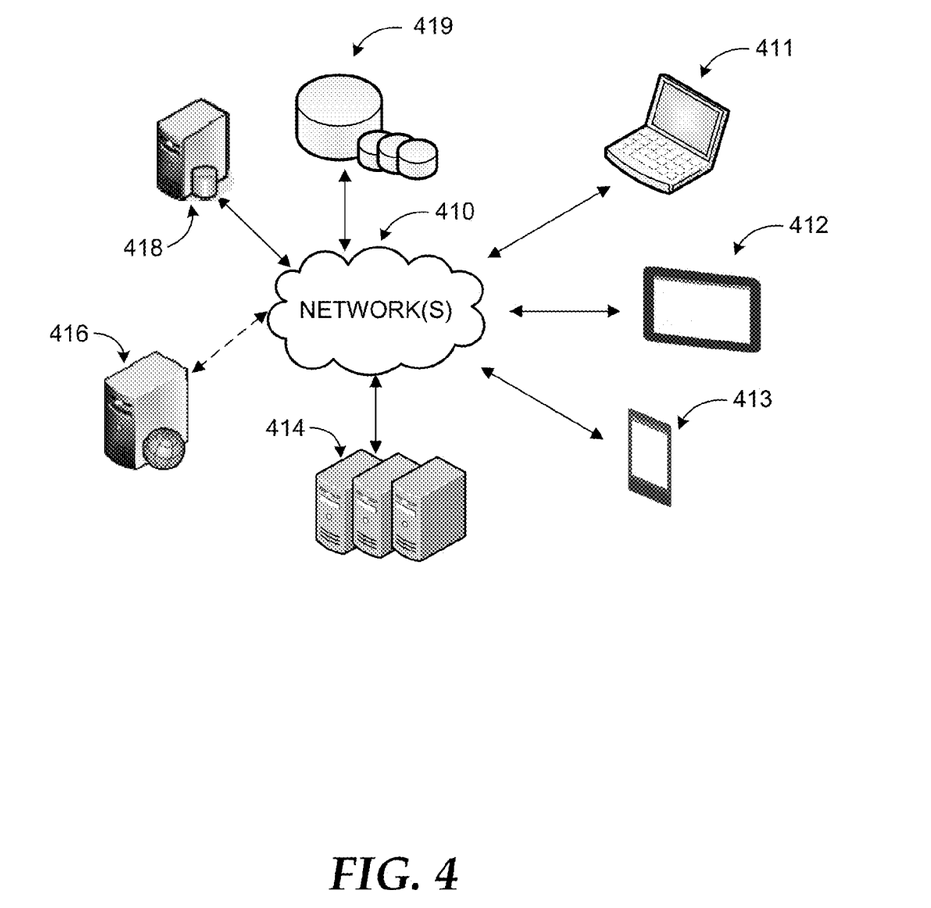
FIG. 4 is a networked environment, where a system according to embodiments may be implemented.

FIG. 4 is a networked environment, where a system according to embodiments may be implemented. Local and remote resources may be provided by one or more servers 414 or a single server (e.g. web server) 416 such as a hosted service. An application may execute on individual computing devices such as a smart phone 413, a tablet device 412, or a laptop computer 411 ('client devices') and communicate with customer and product information providers through network(s) 410.

As discussed above, an application may manage a web extension through a manifest file. A pointer may be added to received attributes of a web extension. The attributes may be stored in the manifest file formatted in XML. The manifest file may be used to manage a functionality of the web extension. Client devices 411-413 may enable access to applications executed on remote server(s) (e.g. one of servers 414) as discussed previously. The server(s) may retrieve or store relevant data from/to data store(s) 419 directly or through database server 418.

Network(s) 410 may comprise any topology of servers, clients, Internet service providers, and communication media. A system according to embodiments may have a static or dynamic topology. Network(s) 410 may include secure networks such as an enterprise network, an unsecure network such as a wireless open network, or the Internet. Network(s) 410 may also coordinate communication over other networks such as Public Switched Telephone Network (PSTN) or cellular networks. Furthermore, network(s) 410 may include short range wireless networks such as Bluetooth or similar ones. Network(s) 410 provide communication between the nodes described herein. By way of example, and not limitation, network(s) 410 may include wireless media such as acoustic, RF, infrared and other wireless media.

Many other configurations of computing devices, applications, data sources, and data distribution systems may be employed to manage a web extension through a manifest file. Furthermore, the networked environments discussed in FIG. 4 are for illustration purposes only. Embodiments are not limited to the example applications, modules, or processes.

Figure 5:
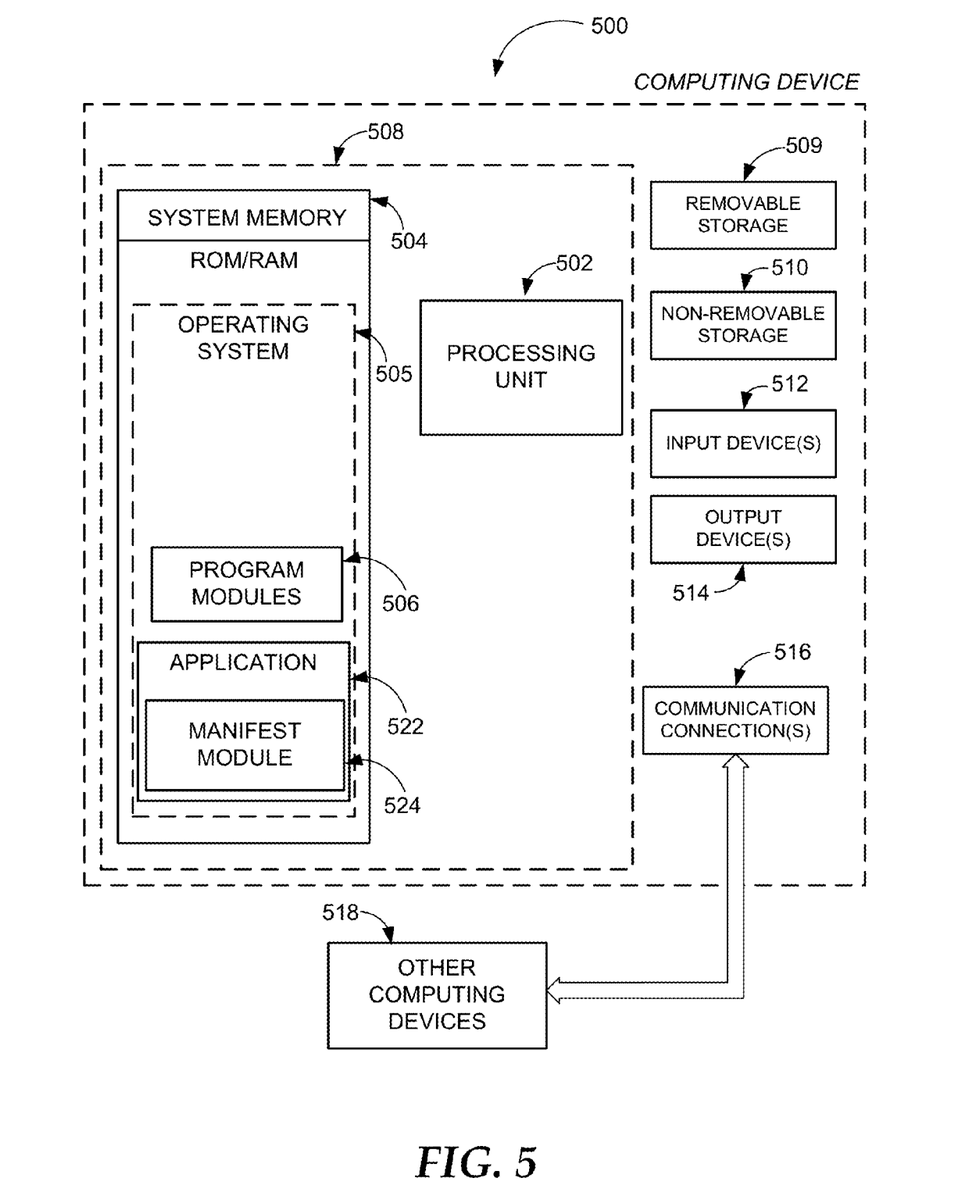
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS® and WINDOWS PHONE® operating systems from MICROSOFT CORPORATION of Redmond, Wash. The system memory 504 may also include one or more software applications such as program modules 506, an application 522, and a manifest module 524.

The application 522 may manage a web extension through a manifest file according to embodiments. The application 522 may receive attributes of a web extension from a developer or metadata of the web extension. After adding a pointer to the web extension into the attributes, the manifest module 524 may store the attributes in a manifest file formatted in XML. The application 522 may manage a consumption, an activation, or a presentation of the web extension based on the manifest file. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. Computer readable storage media is a computer readable memory device. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, gesture input device, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wireless network in a distributed computing environment, a satellite link, a cellular link, and comparable mechanisms. Other devices 518 may include computer device(s) that execute communication applications, storage servers, and comparable devices. Communication connection(s) 516 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be co-located with each other, but each can be only with a machine that performs a portion of the program.

Figure 6:
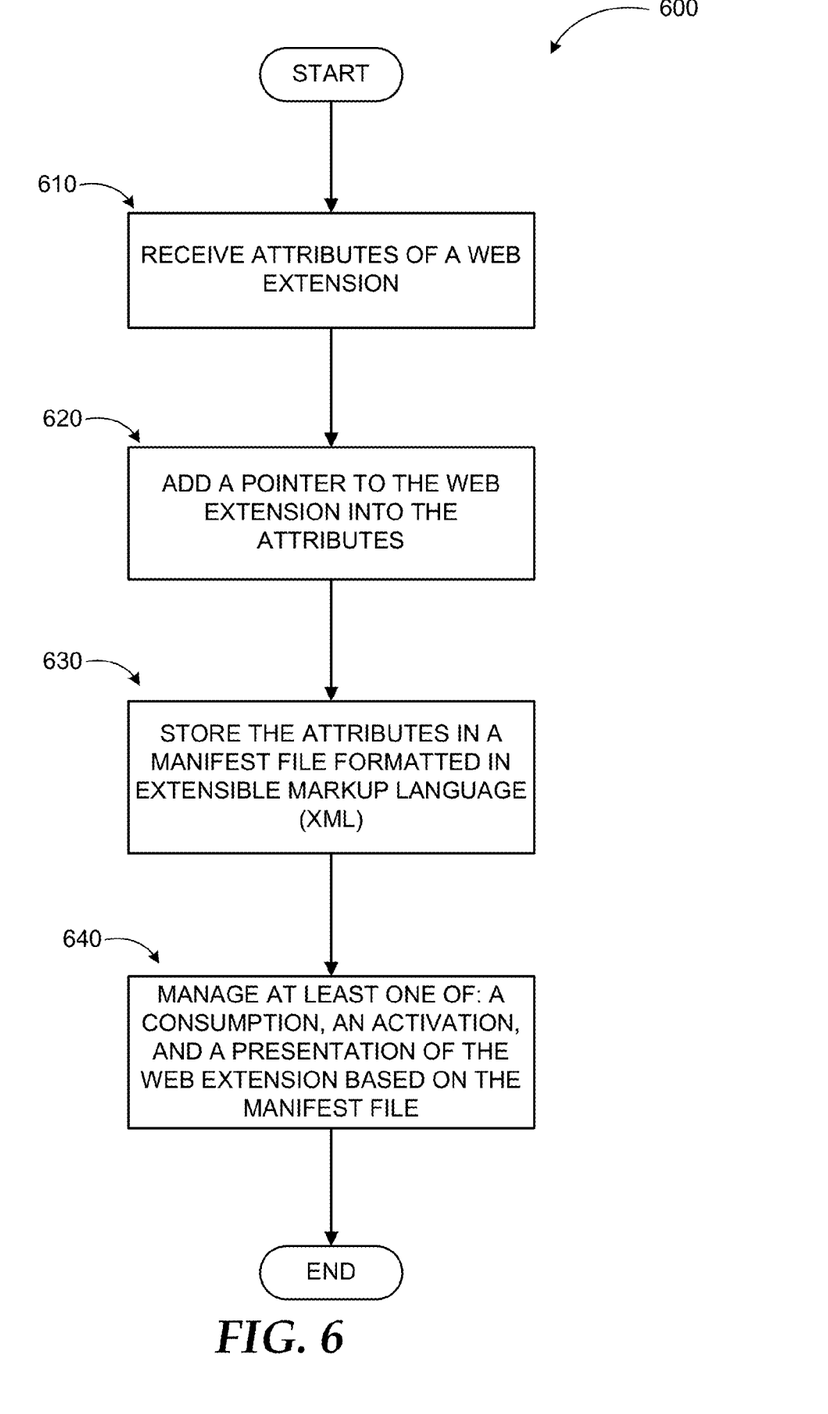
FIG. 6 illustrates a logic flow diagram for a process managing a web extension through a manifest file according to embodiments.

FIG. 6 illustrates a logic flow diagram for a process managing a web extension through a manifest file according to embodiments. Process 600 may be implemented by an application in some examples.

Process 600 may begin with operation 610 where the application may receive attributes of a web extension. A developer with sufficient privileges may provide the attributes. A pointer to the web extension may be added to the attributes at operation 620. The pointer may be a link to the web extension used to activate the extension. At operation 630, the attributes may be stored in a manifest file formatted in XML. XML formatted manifest file may be used as a guide for interactions between the web extension and a document. Next, the application may manage a consumption, an activation, or a presentation of the web extension based on the manifest file at operation 640. The attributes specified in the manifest file may determine the functionality of the web extension.

Some embodiments may be implemented in a computing device that includes a communication module, a memory, and a processor, where the processor executes a method as described above or comparable ones in conjunction with instructions stored in the memory. Other embodiments may be implemented as a computer readable storage medium with instructions stored thereon for executing a method as described above or similar ones.

The operations included in process 600 are for illustration purposes. Managing a web extension through a manifest file, according to embodiments, may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device for managing a web extension through a manifest file, the method comprising:
retrieving attributes of the web extension by accessing metadata of the web extension, wherein the metadata includes the attributes;
identifying a host application as one of the attributes and identifying a versioning as one of the attributes;
identifying a version number of the web extension in the versioning attribute, wherein the version number includes a first version of the host application and a second version of the host application;
generating a pointer pointing to the web extension as an additional attribute;
storing the attributes in the manifest file formatted in a standardized format; and
managing at least one of: a consumption, an activation, and a presentation of the web extension based on the manifest file, wherein the manifest file includes version override elements that enable a developer to specify settings of the second version of the host application to apply in the first version of the host application by referencing a schema for the first version and defining the settings of the second version in the version override elements.

2. The method of claim 1, further comprising:
defining a packaging format with the manifest file to enable the developer to provide the attributes of the web extension; and
utilize the packaging format to deliver the manifest file from a marketplace to the host application.

3. The method of claim 1, further comprising:
utilizing a strong typed format while creating the manifest file.

4. The method of claim 3, further comprising:
enforcing error minimized coding through the strong typed format while manually creating the manifest file; and
automatically validating the manifest file through the strong typed format.

5. The method of claim 1, further comprising:
establishing a link to the web extension through the pointer; and
activating the web extension through the pointer.

6. The method of claim 1, further comprising:
defining a description of the web extension as one of the attributes; and
including an identifier specific to the web extension in the description.

7. The method of claim 1, further comprising:
identifying the host application supported by the web extension in a host application attribute.

8. The method of claim 1, further comprising:
defining a form factor as one of the attributes; and
specifying the form factor supported by the web extension as one of: a desktop, a tablet, and a smart phone in a form factor attribute.

9. The method of claim 1, further comprising:
describing an activation rule as one of the attributes; and
specifying the activation rule determining presentation of the web extension in an activation rule attribute.

10. The method of claim 1, further comprising:
describing a localization as one of the attributes; and defining a language translation configuration for the web extension in a localization attribute.

11. The method of claim 1, further comprising:
using the version number to determine a validity of the web extension.

12. A computing device for managing a web extension through a manifest file, the computing device comprising:
a memory configured to store instructions; and
a processor coupled to the memory, the processor executing an application in conjunction with the instructions stored in the memory, wherein the application is configured to:
retrieve attributes of the web extension by accessing metadata of the web extension, wherein the metadata includes the attributes;
identify a host application as one of the attributes and identify a versioning as one of the attributes;
identify a version number of the web extension in the versioning attribute, wherein the version number includes a first version of the host application and a second version of the host application;
generate a pointer to the web extension as an additional attribute;
store the attributes in the manifest file;
utilize a strong typed format while creating the manifest file to:
enforce error minimized coding through the strong typed format while manually creating the manifest file; and
automatically validate the manifest file through the strong typed format; and
manage at least one of: a consumption, an activation, and a presentation of the web extension based on the manifest file, wherein the manifest file includes version override elements that enable a developer to specify settings of the second version of the host application to apply in the first version of the host application by referencing a schema for the first version and defining the settings of the second version in the version override elements.

13. The computing device of claim 12, wherein the application is further configured to:
store the attributes of an in-content extension as the web extension;
detect a manual insertion of the in-content extension into a document; and
enable the in-content extension to interact with the document, based on the manifest file.

14. The computing device of claim 12, wherein the application is further configured to:
store the attributes of a contextual extension as the web extension; and
associate the contextual extension with a document by matching a set of rules of the web extension with at least one item of the document, based on the manifest file.

15. The computing device of claim 12, wherein the application is further configured to:
store the attributes of a task-pane extension as the web extension;
display the task pane extension associated with a document in a task pane, based on the manifest file.

16. The computing device of claim 15, wherein the application is further configured to:
control at least one resource dedicated to a task associated with the document through the task-pane extension, based on the manifest file.

17. A method for managing a web extension through a manifest file, the method comprising:
retrieving attributes of the web extension by accessing metadata of the web extension, wherein the metadata includes the attributes;
identifying a host application as one of the attributes and identifying a versioning as one of the attributes;
identifying a version number of the web extension in the versioning attribute, wherein the version number includes a first version of the host application and a second version of the host application;
generating a pointer to the web extension as an additional attribute;
establishing a link to the web extension through the pointer;
storing the attributes in the manifest file formatted in extensible markup language (XML);
utilizing a strong typed format while creating the manifest file to:
enforce error minimized coding through the strong typed format while manually creating the manifest file;
automatically validate the manifest file through the strong typed format; and
manage at least one of a consumption, an activation, and a presentation of the web extension based on the manifest file, wherein the manifest file includes version override elements that enable a developer to specify settings of the second version of the host application to apply in the first version of the host application by referencing a schema for the first version and defining the settings of the second version in the version override elements; and
activating the web extension through the pointer.

18. The method of claim 17, further comprising:
identifying the host application supported by a task-pane extension as the web extension in a host application attribute; and
displaying the task-pane extension associated with the host application in a task pane, based on the manifest file.

19. The method of claim 17, further comprising:
describing an activation rule as one of the attributes;
specifying the activation rule determining presentation of an in-content extension as the web extension in an activation rule attribute; and
enabling the in-content extension to interact with a document, based on the manifest file.

20. The method of claim 19, further comprising:
describing the version number of a contextual extension as the web extension in a versioning attribute;
using the version number to determine validity of the contextual extension; and
associating the contextual extension with the document by matching a set of rules of the web extension with at least one item of the document, based on the manifest file, upon determining the validity.

* * * * *